UNITED STATES PATENT OFFICE.

THEODORE WILLIAM DOELL AND LOUIS A. F. MAES, OF CORONA, CALIFORNIA.

PROCESS OF EXTRACTING PECTIN.

1,385,525.     Specification of Letters Patent.     Patented July 26, 1921.

No Drawing.     Application filed December 22, 1919. Serial No. 346,740.

*To all whom it may concern:*

Be it known that we, THEODORE W. DOELL, a citizen of German Austria, and LOUIS A. F. MAES, a subject of the King of Belgium, residents of Corona, in the county of Riverside and State of California, have invented certain new and useful Improvements in Processes of Extracting Pectin, of which the following is a specification.

Our invention relates to the extraction of pectin from the rinds of fruits of the citrus family, apple and pear peelings and cores, quinces and crabapples, and from pectous roots such as celery, carrots, and parsley, and has for its object the provision of a process of extraction and treatment whereby the pectin will be obtained in a dry, powdered state, and in such condition that when subsequently added to water it will form a colorless, tasteless solution to be added to fruit juices in the making of jelly.

In carrying out our process the procedure consists broadly in making a water extraction of the pectin bearing fruits or roots, precipitating the pectin by the addition of salts of the alkali or earth alkali group, subsequently washing and drying the precipitate and then powdering it.

The details of the process may be better understood from the following concrete illustration: One hundred grams of ground lemon, orange, or grapefruit peel, or any other pectin bearing substance, are placed in water and allowed to soak for twenty four hours. The water draws out the hesperidin and similar bitter substances. This water is then drawn off and three pints of fresh water containing one half to one per cent. of organic acid such as tartaric, citric, malic or acetic acids which are naturally present in fruits are poured onto the material and the mass is then boiled for a half hour, more water being added occasionally to maintain the original volume. Instead of using the above mentioned organic acids we might make use of an acid of the halogen group or some other which would not exert an oxidizing action. We then add two per cent. of cellite and two per cent. of acid washed boneblack and continue the boiling for another half hour. The mass is then filtered, while hot, through a felt filter bag and is subjected to pressure to extract all the moisture possible.

The clear decoction is then heated while magnesium or sodium sulfate, or any other sulfate, chlorid or carbonate of the alkali or earth alkali group is added until the solution is saturated. During the addition of this salt the pectin will be precipitated. When the solution reaches the boiling point the precipitate will rise to the top. The mass is then allowed to cool to about fifty degrees centigrade, after which it is filtered. The pectin will remain in the filter in the form of a jelly-like mass which is then washed repeatedly in fresh cold water to remove all traces of the salt solution used for precipitation.

The mass is then dried at a temperature of about ninety degrees centigrade until thoroughly dry, after which it is powdered. The powder is then ready for use in the making of jelly by adding it to fruit juices or solutions thereof containing insufficient natural pectin to provide jellification.

From the foregoing description it will be seen that we have devised a process for obtaining pectin in a dry powdered state which when added to water will produce a colorless, ordorless, and tasteless solution which will therefore not impair the flavor of any fruit solution or extract to which it is added.

Having thus described our invention, we claim:

The process of obtaining pectin consisting in boiling pectin bearing substances in water containing a small amount of acid, adding a bleaching agent, filtering the mass to obtain an extract, precipitating the pectin by the addition to the clear decoction of a salt of the alkali or earth alkali group, removing and washing the precipitate, and then drying and powdering the resultant mass.

In testimony whereof we hereto affix our signatures.

THEODORE WILLIAM DOELL.
LOUIS A. F. MAES.